United States Patent
Brill et al.

(10) Patent No.: US 7,565,362 B2
(45) Date of Patent: Jul. 21, 2009

(54) APPLICATION PROGRAMMING INTERFACE FOR TEXT MINING AND SEARCH

(75) Inventors: Eric D. Brill, Redmond, WA (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 11/172,638

(22) Filed: Jul. 1, 2005

(65) Prior Publication Data

US 2006/0101037 A1 May 11, 2006

Related U.S. Application Data

(60) Provisional application No. 60/626,790, filed on Nov. 11, 2004.

(51) Int. Cl.
*G06F 17/00* (2006.01)
(52) U.S. Cl. .................... 707/100; 709/203
(58) Field of Classification Search .............. 707/2
See application file for complete search history.

(56) References Cited

U.S. PATENT DOCUMENTS

| | | | |
|---|---|---|---|
| 5,873,080 A * | 2/1999 | Coden et al. | 707/3 |
| 6,009,422 A * | 12/1999 | Ciccarelli | 707/4 |
| 6,098,064 A * | 8/2000 | Pirolli et al. | 707/2 |
| 6,278,992 B1 * | 8/2001 | Curtis et al. | 707/3 |
| 2002/0055919 A1 * | 5/2002 | Mikheev | 707/3 |
| 2002/0091712 A1 * | 7/2002 | Martin et al. | 707/200 |
| 2002/0152199 A1 * | 10/2002 | Teng et al. | 707/3 |
| 2002/0169754 A1 * | 11/2002 | Mao et al. | 707/3 |
| 2002/0198869 A1 * | 12/2002 | Barnett | 707/3 |
| 2003/0061211 A1 * | 3/2003 | Shultz et al. | 707/3 |
| 2003/0065636 A1 * | 4/2003 | Peyrelevade | 706/62 |
| 2003/0159566 A1 * | 8/2003 | Sater et al. | 84/615 |
| 2003/0200279 A1 * | 10/2003 | Yoshimoto | 709/217 |
| 2003/0217044 A1 * | 11/2003 | Zhang et al. | 707/3 |
| 2004/0225730 A1 * | 11/2004 | Brown et al. | 709/224 |
| 2006/0031817 A1 * | 2/2006 | Pieper | 717/107 |

OTHER PUBLICATIONS

EP Search Report dated Mar. 27, 2006; mailed Mar. 27, 2006; EP Patent Application Serial No. 05 10 9785; 4 pages.

(Continued)

*Primary Examiner*—Pierre M Vital
*Assistant Examiner*—Truong V Vo
(74) *Attorney, Agent, or Firm*—Lee & Hayes, PLLC

(57) ABSTRACT

Systems and methods are described that allow programmatic access to search engine results and query logs in a structured form. The search results can be retrieved from the search engine in an intermediary form that contains the information that is in the HTML pages provided to web browsers (potentially with additional information). This intermediary form can then be broken down on the client machine, using local resources, to assemble the structured objects. The library also provides for caching of the search results. This can be provided both on the local machine and on a remote database. When the results for a query exist in the caches, they can be retrieved from such location instead of querying the search engine. Documents and/or web pages can also be cached. The library can also be directed to operate only from the cache, effectively exposing a local data set instead of the remote search engine.

13 Claims, 11 Drawing Sheets

OTHER PUBLICATIONS

Seacord, et al.; Agora: A Search Engine for Software Components; Nov. 6, 1998; 10 pages.

Hoong, et al.; Guided Google: A Meta Search Engine and its Implementation Using the Google Distributed Web Services; Feb. 18, 2003; 8 pages.

Agora: A Search Engine for Software Components; Oct. 13, 2004; 8 pages; http://www.sei.cmu.edu/publications/documents/98.reports/98tr011/98tr011chap03.htm>: last viewed Mar. 13, 2006.

Kraft, et al.; Extending the Google API for Web Carnivores; May 17, 2004; 10 pages.

Kraft, et al.; Finding Buying Guides with a Web Carnivore; Nov. 10, 2003; 10 pages.

Saggion, et al.; Mining On-line Sources for Definition Knowledge; Apr. 17, 2004; 6 pages.

Google Web APIs (beta); 2 pages; http://www.google.com/apis/>; last viewed Mar. 13, 2006.

Robert C. Seacord, et al., "Agora—A Search Engine for Software Components", Nov. 1998, XP 002178810. http://www.sei.cmu.edu/pub/documents/98.reports/pdf/98tr011.pdf. Last accessed on Dec. 11, 2008, 38 pages.

Choon Hoong Ding, et al., "Guided Google—A Meta Search Engine and its implementation using the Google distributed Web Services", ARXIV.ORG, Feb. 18, 2003. http://www.gridbus.org/papers/guidedgoogle.pdf. Last accessed on Dec. 11, 2008, 10 pages.

EP OA dated Jun. 4, 2008 for European patent Application No. 05109785.5, 9 pages.

* cited by examiner

APPLICATION PROGRAMMING INTERFACE FOR TEXT MINING AND SEARCH

CROSS-REFERENCE TO RELATED APPLICATIONS

This application claims benefit under 35 U.S.C. § 119(e) from U.S. Provisional Patent application Ser. No. 60/626,790 entitled, "APPLICATION PROGRAMMING INTERFACE FOR TEXT MINING AND SEARCH" and filed Nov. 11, 2004, the entirety of which is hereby incorporated by reference.

BACKGROUND

In today's information age, the location and collection of data has been simplified by various tools available to consumers. One method of such data collection can be facilitated via an interface to a network of computers (e.g., internet, intranet, LAN, WAN, etc.), where a user can enter desired information into a search engine and retrieve a set of results that correspond to entered search elements. In addition, the user can repeat search efforts to refine and/or modify the data the user wishes to retrieve. Such additional searches can be conducted manually or automatically based on the user's desires.

There exists a number of various search engines that perform searches employing unique algorithms and/or techniques to locate and return data to a user. For example, one search engine can provide a tool that allows a user to request data utilizing a boolean string whereas another search engine can employ a natural language interface to the user. By way of further example, the search engine can restrict its search to documents that meet predetermined criteria, whereas a second search engine can search every available resource to retrieve requested information.

Typically, the search engine acts as a service wherein the service makes a call to desired potential data sources and then receives a set of information such as text or extensible mark-up language (XML), for example. Such data results can be returned in an unorganized manner wherein the user must sort through all returned information to determine if one or more results contain the information the user wished to retrieve. In this manner, the search for information can be inefficient and/or incomplete if the user fails to locate desired information from the returned set. Moreover, if the user is repeatedly performing searches for data, it can be inefficient for the user to continuously enter search elements into the search engine. What is needed are systems and/or methods that allow more efficient searching and locating of data desired by a user.

SUMMARY

The following presents a simplified summary of various aspects described herein in order to provide a basic understanding of such aspects. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

Systems and methods are described that allow programmatic access to search engine results and query logs in a structured form. The search results can be retrieved for example from the search engine in an intermediary XML form that is similar to what is used to prepare the hypertext mark-up language (HTML) pages for web browsers. This intermediary form can then be broken down on the client machine, using local resources, to assemble the structured objects. The intermediary form can contain more information than what would typically be contained in the HTML result pages prepared for web browsers (such as, but not limited to, debugging statistics or ranking data).

The library also provides caching of the search results. This can be provided both on the local machine and on a remote database. When the results for a query exist in the caches, they can be retrieved from such location instead of querying the search engine, for example. Documents (web pages) can also be cached. The library can also be directed to operate only from the cache, effectively exposing a local data set instead of the remote search engine. The cached data can be edited or completely constructed. Multiple caches can be supported, in that if the cache is changed over time, search results can be compared for different timeframes by switching caches.

The library can target multiple search engines utilizing the same API component. This allows applications using the API component to instantly switch between search engines without changing their code. The library handles the transformations needed to make all search interaction appear the same. Additionally, the library can fabricate web pages that appear to be result pages of a particular search engine, even if the query and results came from a different search engine or were entirely constructed.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
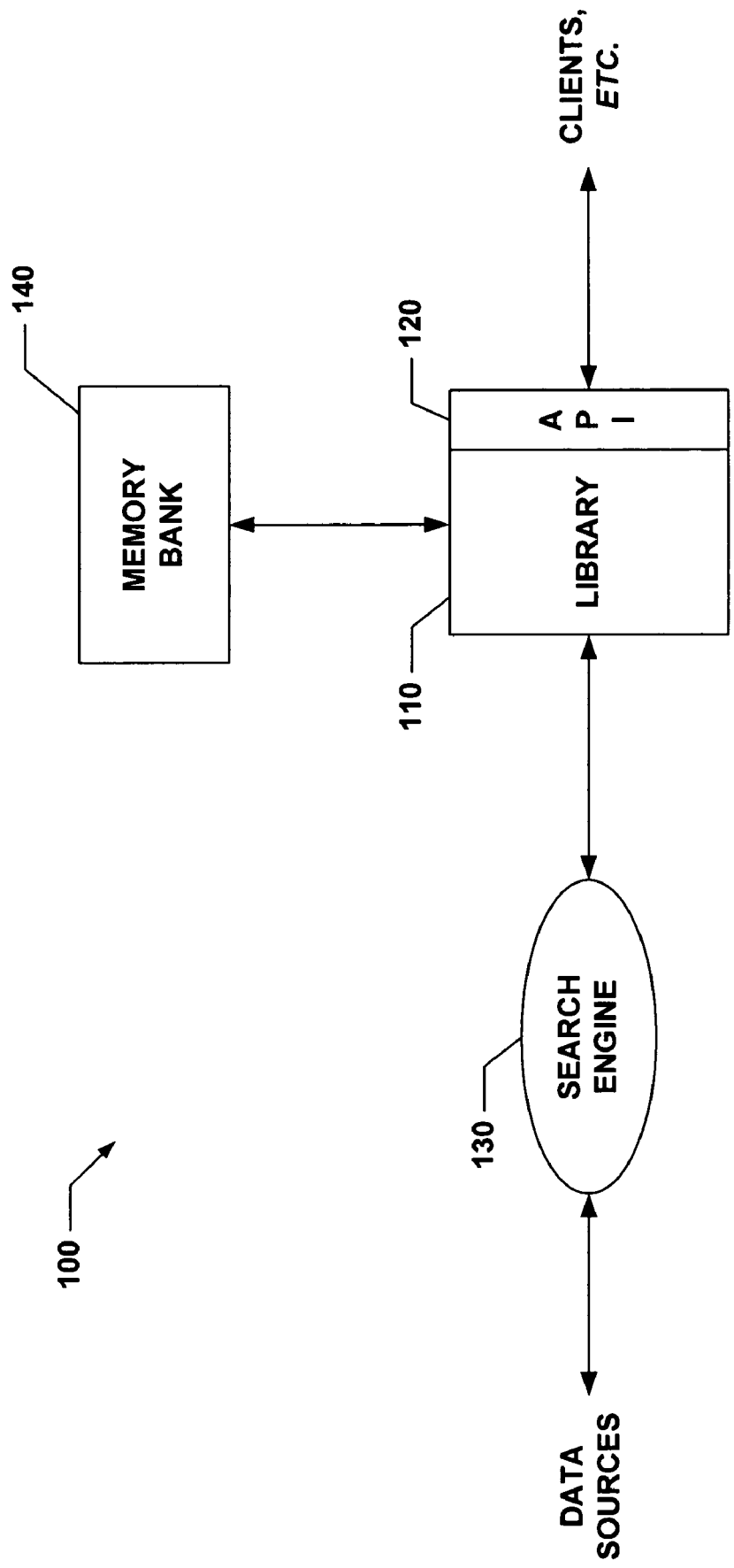
FIG. 1 illustrates an exemplary data retrieval system in accordance with an aspect.

Appendix A describes various class libraries and application program interfaces, and this document is considered part of the subject specification.

DETAILED DESCRIPTION

The various aspects of the subject invention will now be described with reference to the drawings, wherein like reference numerals are used to refer to like elements throughout. The invention relates to systems and methods that can allow developers to utilize an application programming interface (API) component that provides access to search engine results and query logs. Search engine results can be cached and query logs can utilized so that a developer can use such API components to interface with a library of search results and query logs to be able to more easily design programs and/or websites that would leverage off of the cached search results and query logs. In this manner, an application utilizing such search results can be rendered more efficient and can limit the processing load to the search engine by utilizing a cache of results in lieu of employing the search engine repeatedly. Such caching of data can occur in multiple locations such as on a local disk, in memory or on a pre-configured cache server, for example.

Referring now to FIG. 1, which illustrates a system 100 with a library 110 and an API component 120 that interfaces with a search engine 130 and a memory bank 140. The library 110 can be employed to provide data to one or more users in a structured form via the API component 120. Such data can be gathered from various sources, such as the search engine 130 and the memory bank 140, for example. In this manner, the structured form of the data can mitigate the need for parsing out desired data and/or creating programmatic objects in order to access such data.

The API component 120 can be employed to assemble and extract parts of information from the search engine 130 and thus, provide such information in a structured format via the library 110. The structure of the data can be configured automatically or manually based on a user's and or application's needs. Moreover, the API component 120 can utilize client resources in order to alleviate loading of the search engine 130, for example. The structure of the data can be defined via a class library (See Appendix A which is considered part of this specification). The class library can be employed to determine the structure and content of the data that is returned by the search engine and subsequently presented to the library 110. Thus, according to one approach, a web site developer can employ the API component 120 to interface with data from the search engine 130 and/or the memory bank 140 to be able to more easily design programs and/or websites that by leverage off of data supplied by either data source.

The API component 120 can interface with one or more disparate applications and/or devices (e.g., the memory bank 140) to provide data without actually instantiating the search engine 130 each time data and/or results are desired. In this manner, requested data can be provided to the requester more quickly than conventional methods without taxing the actual search engine. Additionally, system resources can be allocated and managed such that overloading conditions can be mitigated. Thus, when data is requested repeatedly, results can be provided more quickly than conventional methods.

The search engine 130 can be any suitable type of application capable of accepting a set of search criteria and utilizing such criteria to search for and provide one or more results that meet the desired search criteria. Search criteria can relate to one or more aspects of information desired such as data length, format, content, date of creation and so on. Additionally, the search engine 130 can employ one or more methods of accepting data elements to employ in a search such as various languages, boolean connectors, content, format and the like. One or more users can access the search engine 130 locally and/or remotely. Such interfacing can be accomplished utilizing at least one protocol and/or standard that facilitates communication between the API component 120 and the search engine 130. For instance, the API component 120 can be located on a processing component that employs Ethernet to communicate to a wireless Ethernet server. The wireless server in turn can communicate with the search engine 130 to request at least one search to be conducted.

The search engine 130 can conduct searches based on an event, periodically or continuously as desired. For example, the search engine 130 can employ a set of criteria to perform a search once a week for a period of six months. In this manner, content that is added to a particular network over time can be accessed on a regular basis to insure the user is receiving current data content. By way of further example, an artificial intelligence (AI) component (not shown) can be connected to the search engine 130 to determine a best manner in which to perform a search of the data. For example, the data criteria of the user can be modified to provide an ideal set of data results. Similarly, the AI component can be employed to determine when searches are performed based on events and/or additional information available to the search engine 130.

In one aspect of the invention, the appropriate location to provide requested search elements to the accessing component can be determined by machine learning where one or more training sets of data with examples of desired results and/or undesired results for searches can be utilized to train the system. In another aspect, initial conditions, based on one or more features that indicate desired results, can be utilized. Such initial conditions can be adjusted over time and in response to user actions associated with returned results in order to improve discrimination. For example, results utilized by the user can be employed to train the system to learn desired results for the associated query. In addition, knowledge of which results are most often requested for a particular data item can be used to configure the appropriate interface to expose only such information that a data subscriber is interested in and/or authorized to view. For example, a result that is accessed more times by the user can be deemed more useful to the user. In this manner, if a particular data consumer requests specific properties and/or methods, such data aspects can be utilized in the future.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion)

can be employed in connection with performing automatic and/or inferred action in connection with the subject invention.

In yet another aspect of the invention, a technique can be employed to anticipate the search criteria employed by a user. For example, information such as historical data representing data and attributes associated with such data utilized to provide requested search elements to the accessing component can be employed to predict a preferred location to retrieve requested data within a network. For example, intelligent decisions based on statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks can be employed in accordance with an aspect of the subject invention. In this manner, the AI component (not shown) can be employed by the accessing component 110 to provide decision making based on learned actions of a particular data consumer in relation to a particular data source.

The memory bank 140 can be utilized to store parameters related to data and/or to store actual data. Such data can be structured in the memory bank 140 as desired and further can provide for data to be organized and edited by the user. For example, data related to the search engine 130 such as queries and results be stored in the memory bank 140 and accessed as desired. Further, data from the memory bank 140 can be employed exclusively to alleviate expending resources of the search engine 130.

Figure 2:
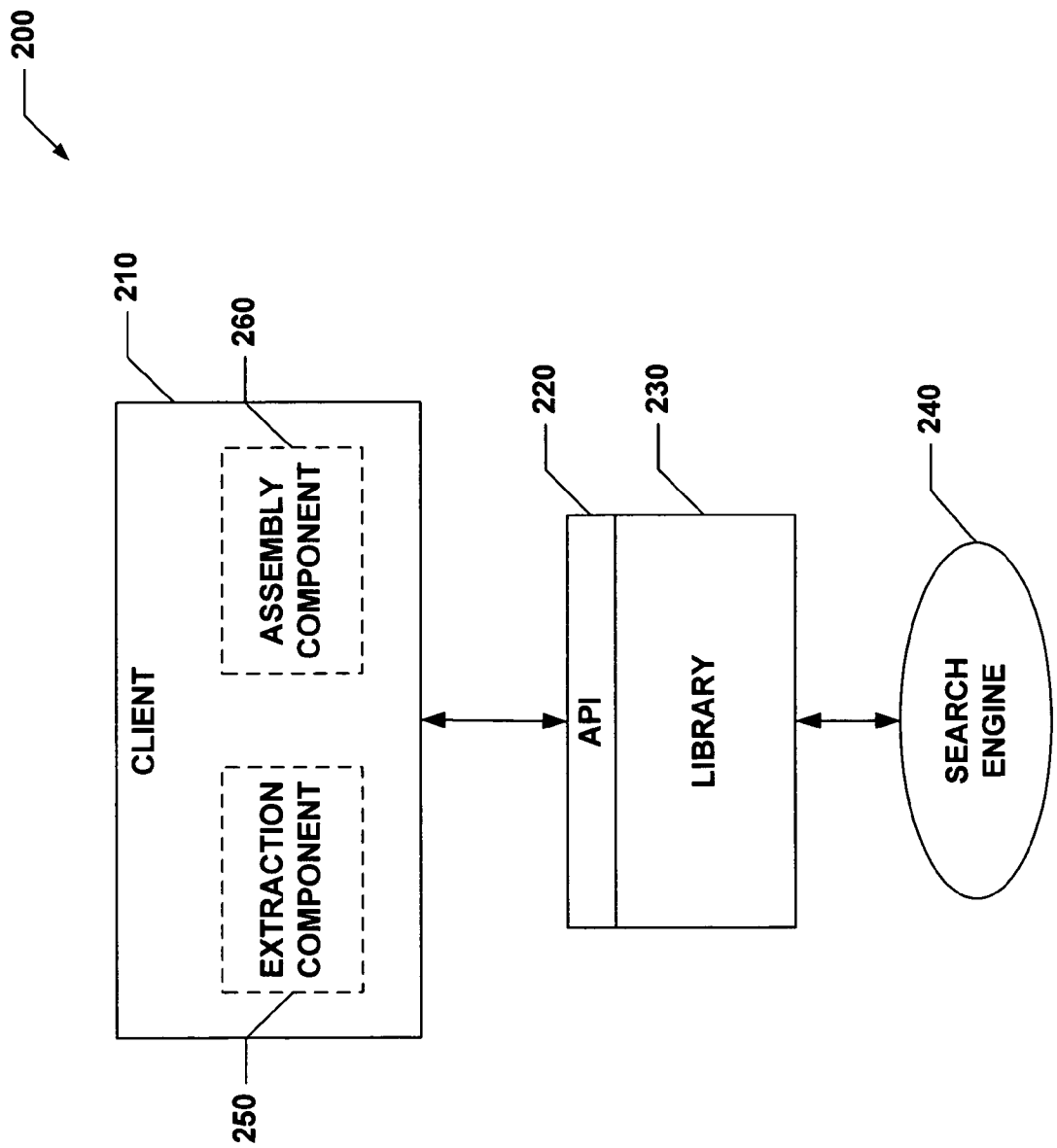
FIG. 2 illustrates an exemplary data retrieval system with an extraction component and a results component in accordance with an aspect.

FIG. 2 illustrates a system 200 where a client is coupled to an API component 220 and a library 230 to access a search engine 240. An extraction component 250 and an assembly component 260 are employed with the client to facilitate consumption of data received from API component 220. The client 210 can be substantially any device, system and/or component that requires data from a disparate source. For example, the client can be an application running on a processor wherein the application employs data to create and publish web pages to one or more users.

The extraction component 250 can be utilized to accept data from the API component 220 and/or the library 230 in an intermediary form wherein the data can be more easily manipulated and consumed by the client 210. For instance, search results from the search engine 240 can be presented to the client in an XML intermediary form that is substantially close to data employed to prepare HTML pages for web browsers. The extraction component can then parse out desired data using client resources. Once broken down, the assembly component can bring together the extracted data to create an HTML web page, for example.

Figure 3:
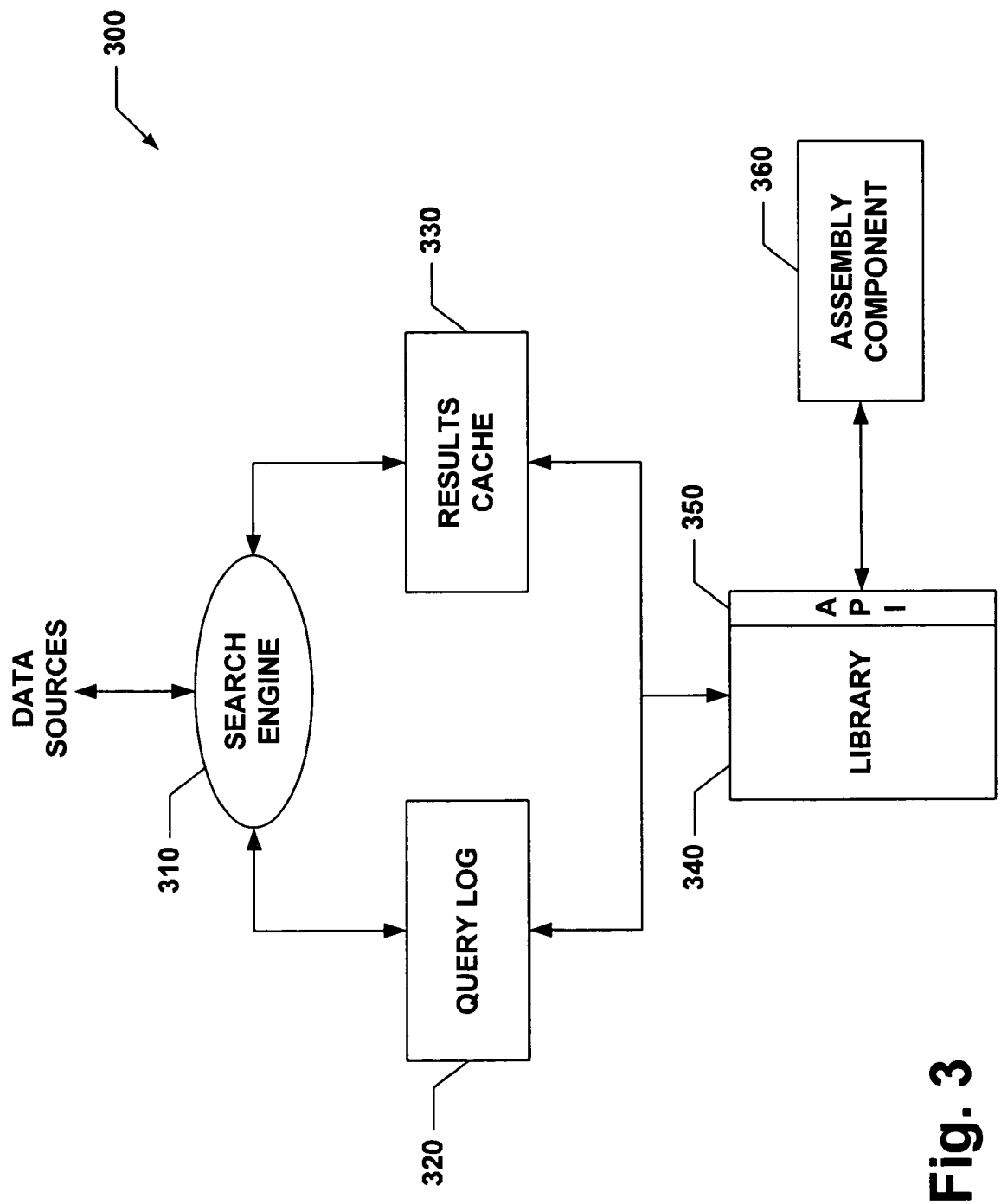
FIG. 3 illustrates an exemplary data retrieval system with a query log and a results cache in accordance with an aspect.

FIG. 3 illustrates a system 300 wherein a search engine 310 is coupled to a query log 320 and a results cache 330. Both the query log 320 and the results cache 330 interface to a library 340 to allow data to be transferred from the search engine 310. The library 340 can communicate to the assembly component 360 via an API component 350. As discussed above, the search engine 310 can accept data objects as search terms and subsequently perform a search to retrieve data from one or more disparate sources. Such search terms can be stored in the query log 320 and can be organized, edited and retrieved at a later time. Similarly, data gathered by the search engine 310 can be stored in the results cache 330 and organized and structured as desired.

In this manner, the library 340 can interface to both the search engine 310 and to results from the search engine as stored in the results cache 330. The library can structure data from either source to provide to a disparate party. The API component 350 can request desired structure of data from the library to be employed by the assembly component 360. The proper source for requested data can be determined based on one or more factors such as the frequency of the requests, the content and/or type of data desired and/or the age of the data desired. In this manner, more efficient use of system resources can be managed while providing data that meets user expectations. In addition, the results cache 330 can be employed to convert stored data from one format to another format, for example. Moreover, one or internal audits can be conducted to delete redundant search results and to provide clean up of data, as desired.

In addition, the results cache 330 can assemble returned data that the user can interface and use to select desired data. For example, data stored in the results cache 330 can be employed to create a replica web page. In this manner, the assembly component 360 can receive data that appears to be real time data. Additionally, the results cache 330 can allow the assembly component 360 to retrieve real time data as desired. In this manner, the results cache 330 can be used in place of or in conjunction with the search engine 310 to retrieve desired data.

Data and/or data pointers that reside in the results cache 330 can be organized and edited in order to facilitate efficient access to the data and/or data pointers that populate the results cache 330. For example, data can be grouped according to searches conducted, data content, data format and the like. As another example, the data content can be edited to simplify consumption by a disparate device, such as the assembly component 360. Thus, utilizing the results cache 330 can provide pre-formatted data and mitigate employment of search engine resources to provide a more efficient system architecture.

The library 340 can request and receive data both from real-time sources, such as the search engine 310 and from stored locations such as the query log 320 and the results cache 330. The API can be employed to request data, content, structure and the like from the library in order to provide this information to the assembly component 360. For example, the data delivered to the assembly component 360 can be an XML form that can be parsed and reconstructed as desired. For example, the assembly component can employ both real time and stored data to create an interactive replica web page that can be employed by one or more users. Thus, the assembly component 360 can receive data from the API 350 and reconstruct data as desired by the user.

Figure 4:
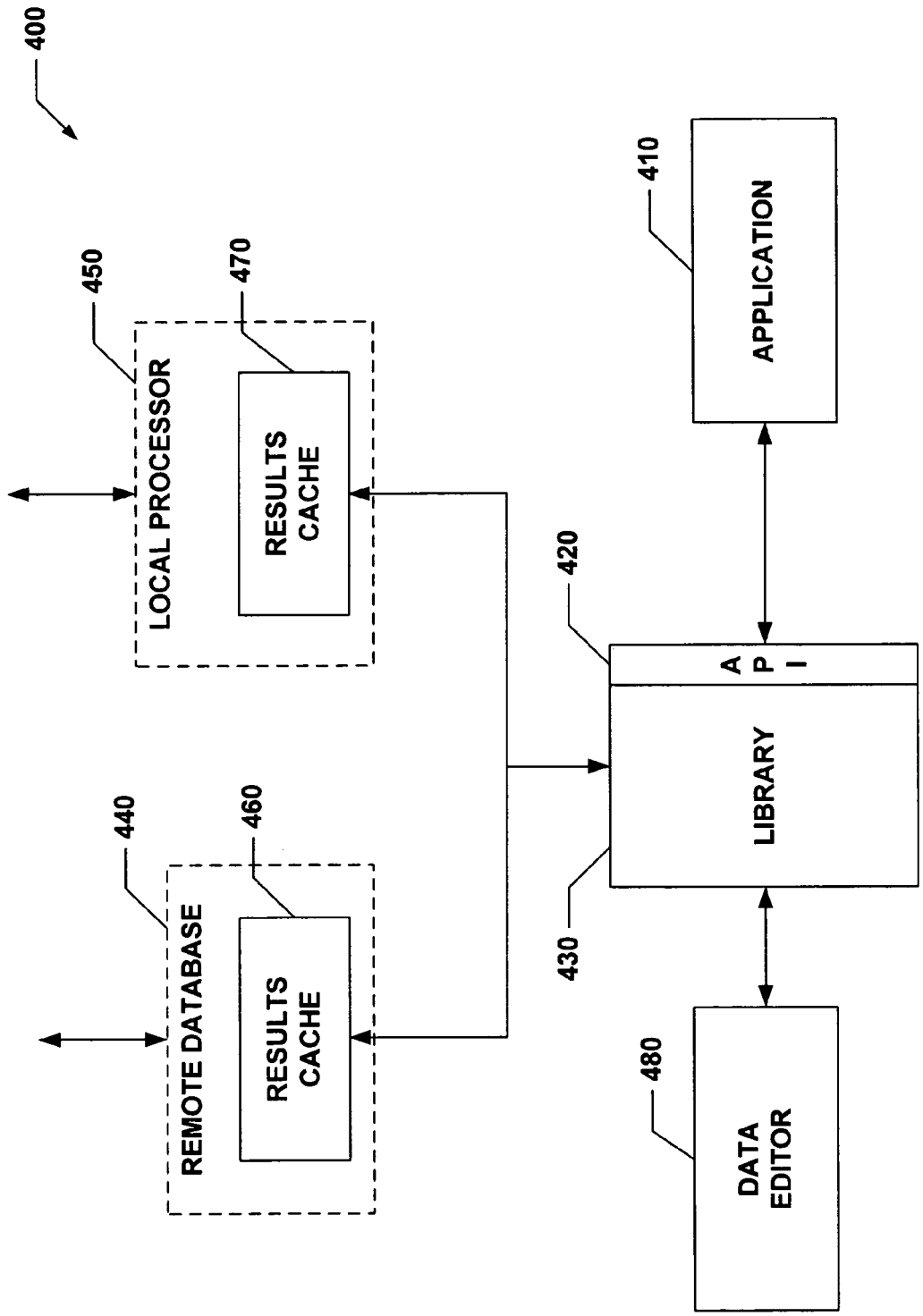
FIG. 4 illustrates a library and application program interface in accordance with an aspect.

FIG. 4 illustrates a system 400 wherein an application 410 employs an API component 420 to interface with a remote database 440 and a local processor 450 via a library 430. The remote database 440 and the local processor 450 contain a results cache 460 and 470. These caches can provide data stores for particular data types, formats, content and so on. Thus, results from a query can be retrieved from one or more results caches (e.g., 460, 470, etc.) as desired by the user. The library 430 can also be directed to operate only from the cache, effectively exposing a local data set instead of the remote search engine, for example. The cached data can be edited or completely constructed via the data editor 480. Further, multiple caches can be supported—that is, if the cache is changed over time, search results can be compared for different time frames by switching caches (e.g. from results cache 460 to results cache 470).

The data editor 480 can be employed by the library 430 to edit, organize and structure data as desired. For example, the application 410 can leverage data from one or more results caches and can structure and/or configure data to conform to requirements of the application 410. The data editor 480 can employ any number of means to communicate with the library 430. For example, the data editor can be a human machine interface that provides tools for making desired changes to data within the library 430.

The remote database 440 can be almost any platform wherein data is stored. Such data can be configured, organized, edited, etc. within the remote database 440. The remote database 440 can interface to the API component 420 via a network connection (e.g., LAN, WAN, CAN, etc.) and utilize various communication protocols and/or standards to interface to the API component 420. For example, the remote database can be located in a disparate network and can accept results after each search for data is performed.

The local processor 450 can be substantially any type of device that can accept and process data in order to achieve a result. Such processing can be done via software and/or hardware that can reside in the local environment. Maintaining a local cache of search results can alleviate processing time employed with a disparate device such as a search engine for example. The local processor can be a computer, a programmable logic controller, software, firmware, etc. It is to be appreciated that although the processor is local to the API component 420, it can interface to the API component 420 in substantially any location utilizing any number of protocols and/or standards.

Figure 5:
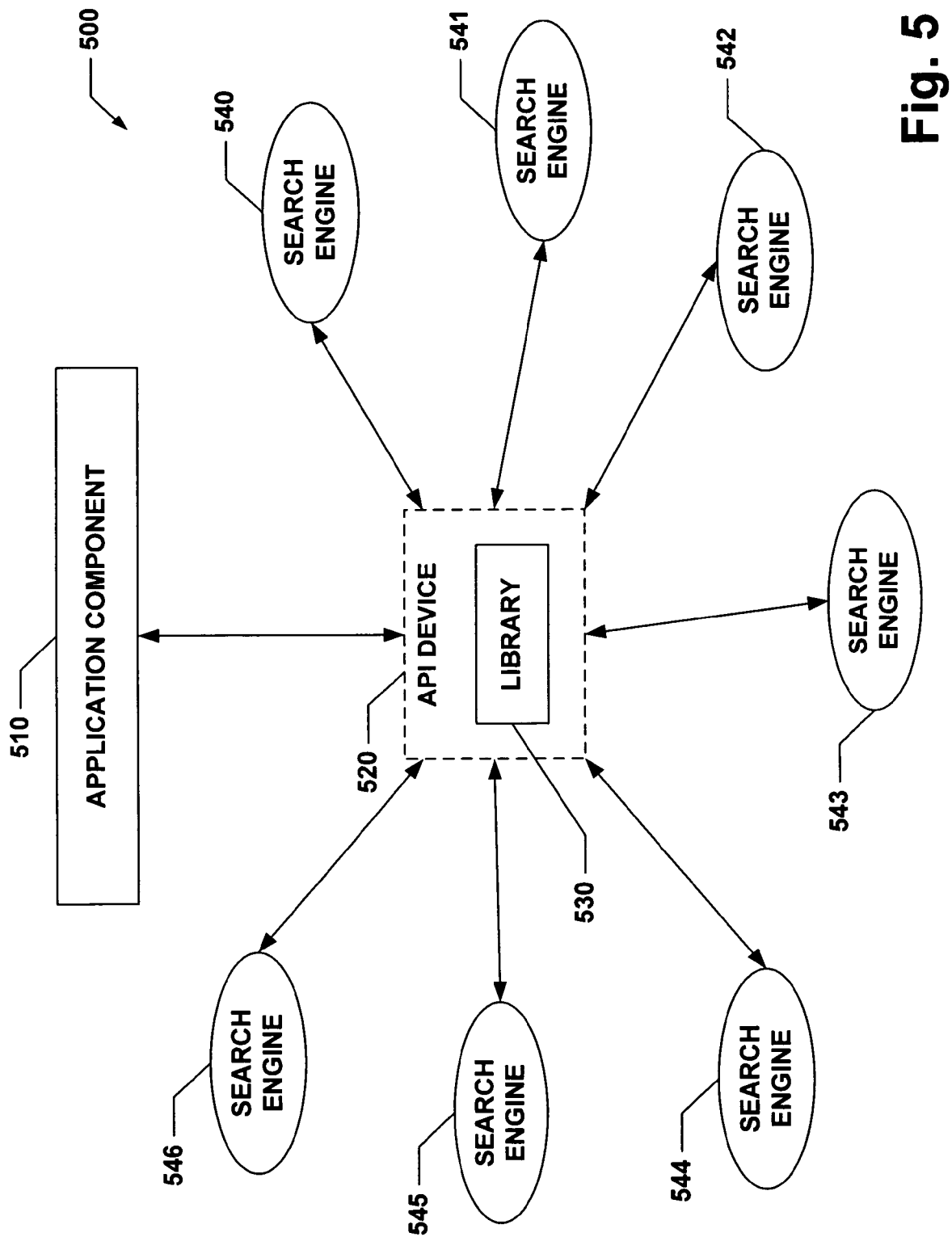
FIG. 5 illustrates an exemplary system that employs a library and an application program interface with a plurality of search engines in accordance with an aspect.

FIG. 5 shows a system 500 wherein an application component 510 utilizes an API device 520 to interface to a plurality of search engines 540-546. The API device 520 contains a library 530 that contains search engine results and/or query logs of one or more search engines 540-546. The application component 510 can be software employed to create and assemble web pages, for example. In one approach, the application component 510 can quickly locate and employ particular data as needed by utilizing the API device 520. The API device 520 can employ an interface to allow a user to select and configure various data elements returned from one or more search engines 540-546. In addition, the API device 520 can be employed to determine the data desired via search as well as the number and location of particular search engines associated therewith.

The search engines 540-546 can be located remotely or local to the API device 520. For example, search engine 541 can be remote to the API device 520 and accessed via the Internet. In contrast, search engine 544 can be a local application utilized on the same computer as the API device 520, for example. Various protocols can be employed to facilitate communication between the API device 520 and one or more search engines 540-546.

More than one protocol can be employed to provide communication between components within system 500 and such protocols can be employed concurrently with one another. For example, communication with search engine 540 can utilize a wireless protocol (e.g., wireless Ethernet, infrared, etc.) while search engine 546 concurrently employs Ethernet. In this manner, the API device 520 is not restricted to a specific I/O interface to request data searches and returns from the search engines 540-546.

Multiple search engines can be targeted utilizing the API device 520. This can allow the application component to utilize the API device 520 to seamlessly switch between the search engines 540-546 without changing their code. In addition, the API device can handle transformations needed to make substantially all search interaction appear the same. Additionally, the API device 520 can fabricate web pages that appear to be the result pages of a particular search engine 540-546, even if the query and results came from a different search engine or were entirely constructed from disparate sets of data.

The search engines 540-546 can employ any number of specific algorithms and/or routines to accept and conduct requested data searches. In addition, each search engine 540-546 can provide specific information as desired by the user. In this manner, the API device 520 can act as a library that is populated by the returns of searches performed by one or more search engines 540-546. Such returned data can be structured in that it can be accessed by the application component 510 to eliminate the need for parsing and creating programmatic objects for the returned data.

Figure 6:
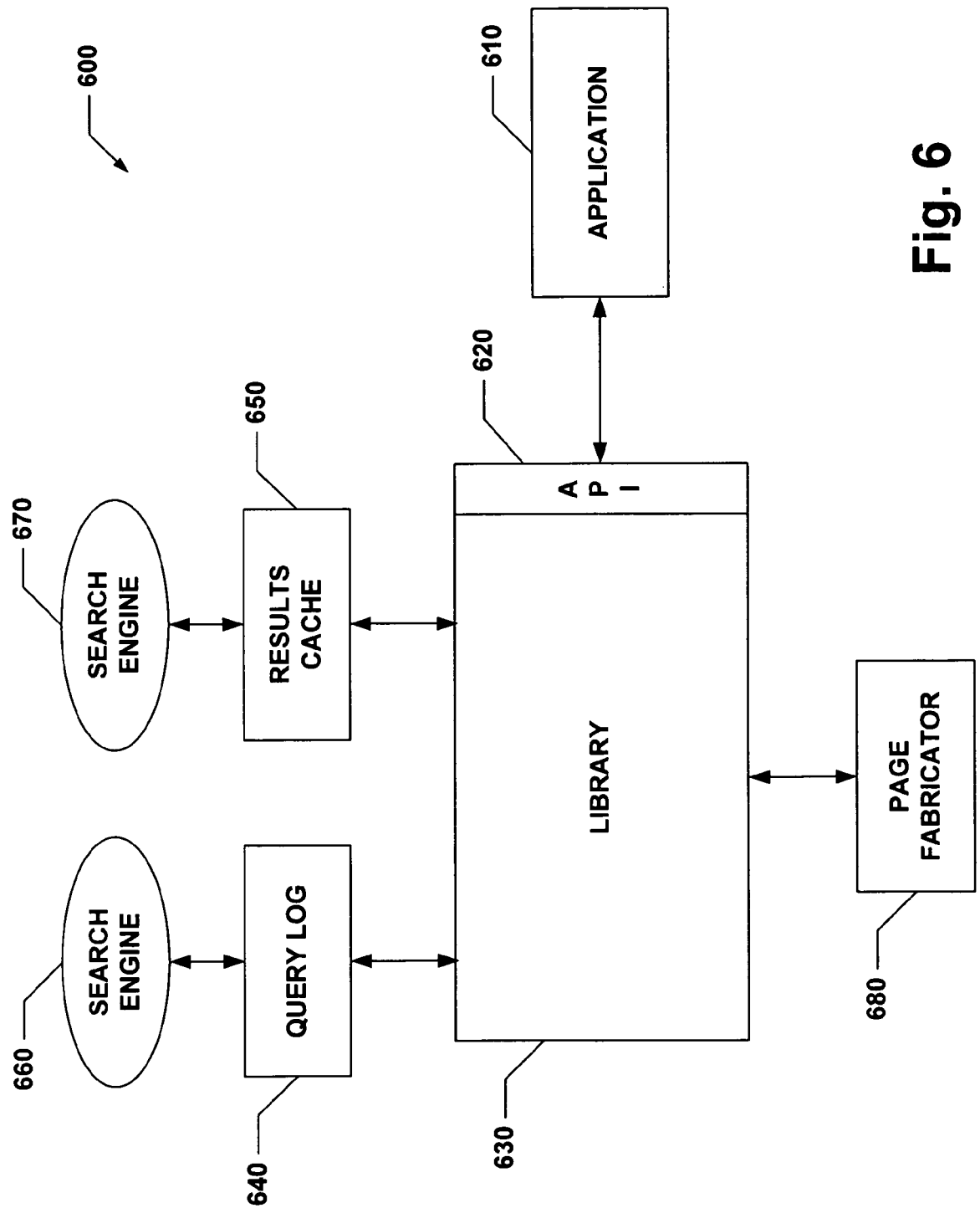
FIG. 6 illustrates a data assembly system employed with a page fabricator in accordance with an aspect.

FIG. 6 illustrates a system 600 wherein an application 610 communicates with an API component 620 and a library 630. The library 630 interfaces with a query log 640 coupled to search engine 660 and results cache 650 coupled to search engine 670. Search engines 660 and 670 can conduct desired searches for particular data. The results cache 650 can be populated by documents and/or XML forms returned from one of the search engines 660 and 670, for example. The search results can be retrieved from the search engine in an intermediary XML form similar to the data form employed to prepare HTML pages for web browsers.

The query log 640 can be coupled to the library 630 to provide storage of various data associated with one or more data searches. The query log 640 can contain one or more statements, search elements, descriptors and the like that have been employed to conduct a search for particular data. The query log 640 can employ an editing component (not shown) that can organize and partition data as desired by a user. For example, data can be sorted by session, by search, by keyword and so on.

A page fabricator 680 can be coupled to the library 630 to create replica web pages utilizing disparate data sources. For example, the page fabricator 680 can employ data to fabricate web pages that appear to be the result pages of a particular search engine, even if the query and results came from disparate search engines (e.g., search engines 660 and 670) or were entirely constructed. By way of further example, a web page or pages can be created utilizing data from the same search engine and a query log and results cache associated therewith.

Figure 7:
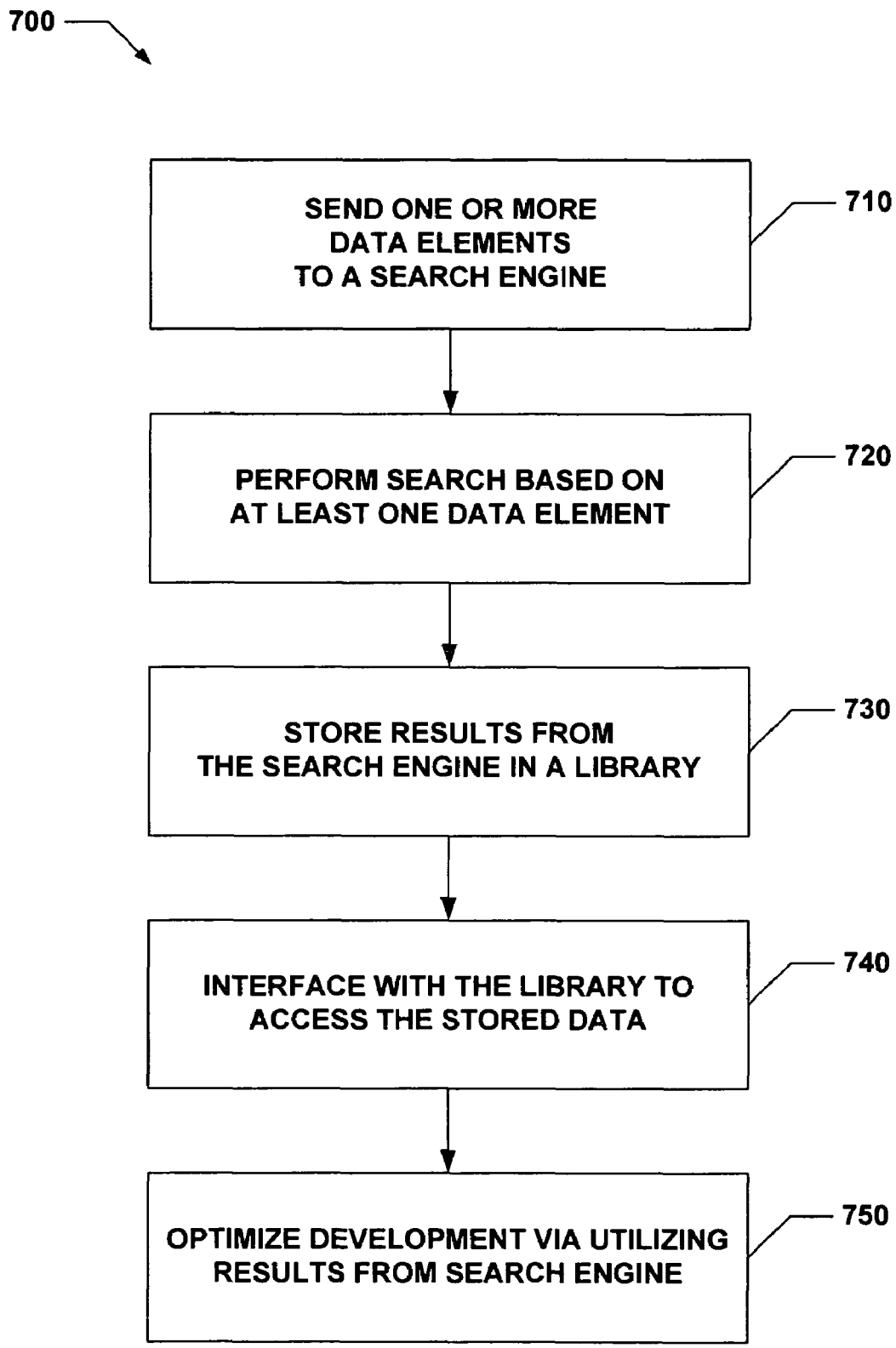
FIG. 7 illustrates an exemplary methodology that optimizes development via utilizing results from a search engine in accordance with an aspect.
Figure 8:
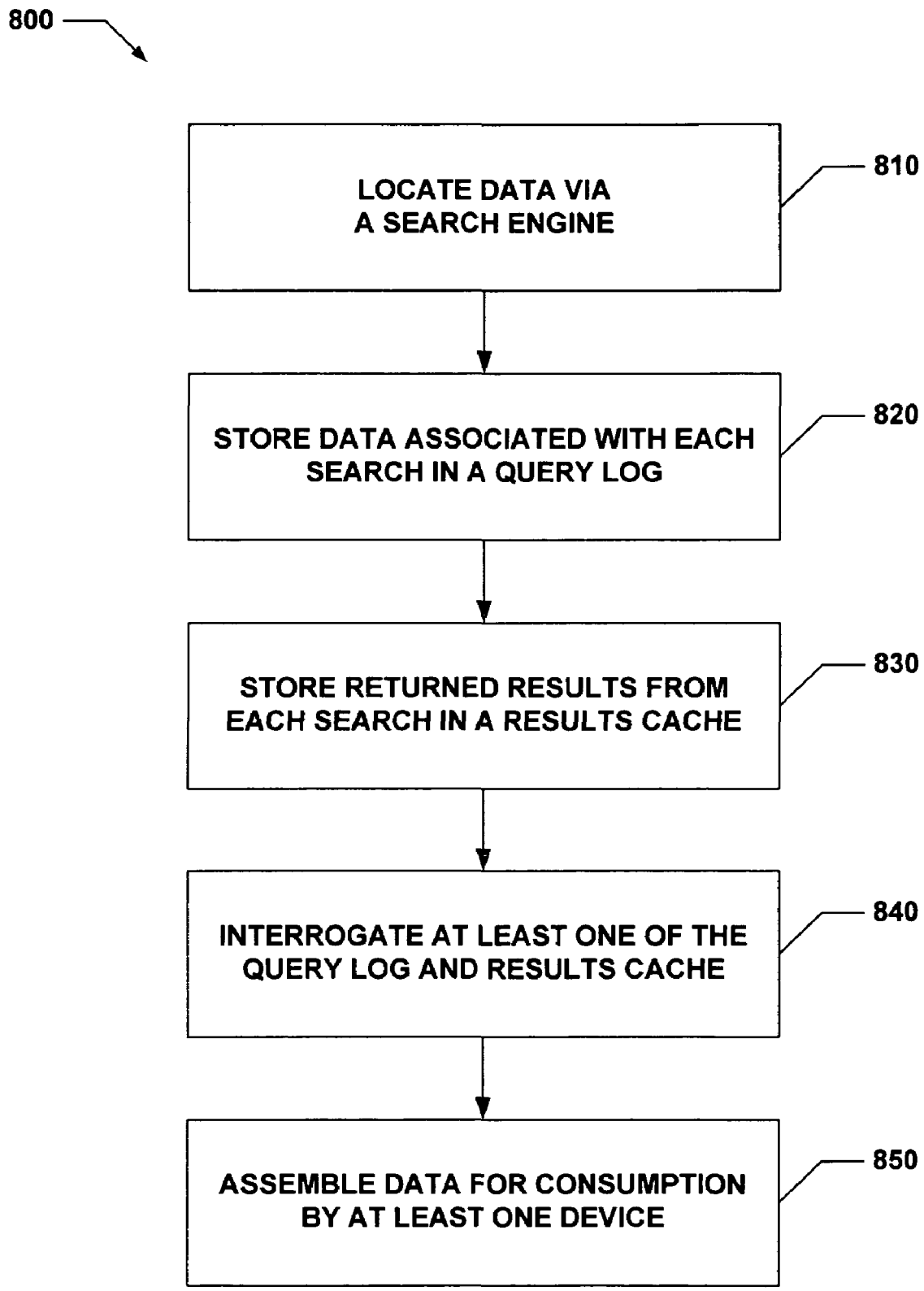
FIG. 8 illustrates an exemplary methodology that retrieves and assembles data for consumption from offline data sources in accordance with an aspect.
Figure 9:
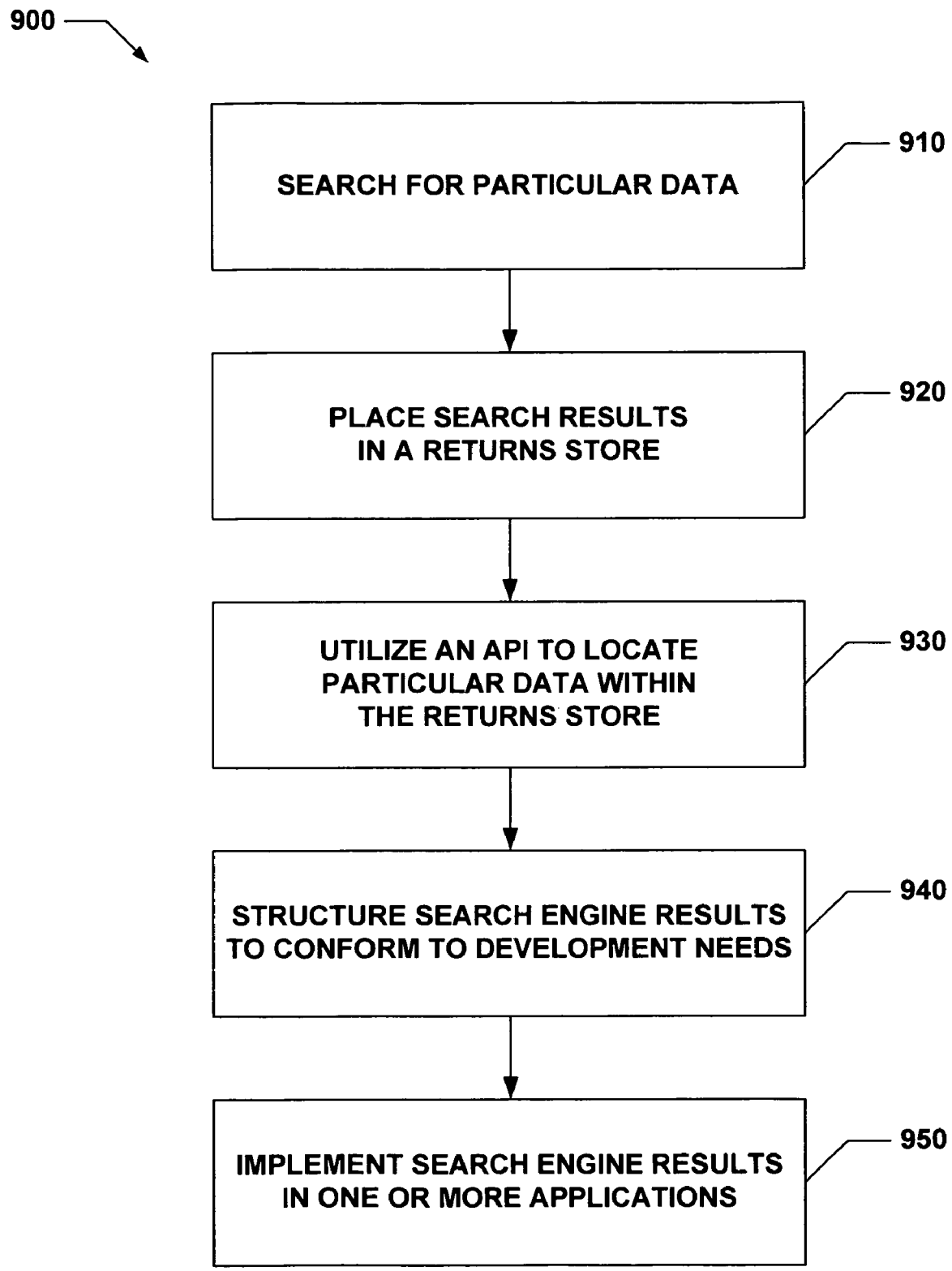
FIG. 9 illustrates an exemplary methodology that utilizes an API to locate and implement data in accordance with an aspect.

FIGS. 7, 8 and 9 illustrate methodologies 700, 800 and 900 in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 that employs at least one search engine to locate and retrieve particular data to utilize with one or more components. At 710, one or more data elements are sent to a search engine. Such data elements can consist of substantially any desired data length, format, content, packaging and so on. The one or more data elements can be conveyed to the search engine utilizing various protocols and/or standards. In addition, the search engine can employ one or more algorithms to interface with various data sources to locate the requested data. Such search engines can be located locally to the party sending the data elements (e.g., on the same computer) or remotely such as on a disparate network.

At 720, a search is performed based on the at least one data element sent by the requestor. The search conducted can be tailored to a user's needs or requirements. For example, the search can be limited to only a subset of available resources or limited to data that conforms to one of several predetermined formats. The search can be conducted manually (e.g., user initiated) or automatically (e.g., based on event, periodically or one time). At 730, results from the search engine are stored. Such results can be parsed and organized such that data is available to a user in a more consumable form. Storing the data can be limited based on time and/or other factors to maintain only a set of data that meets a particular time limitation, for example. By way of further example, the data can be grouped such that like data is stored together and/or data that meets certain criteria is stored as a subset, as desired.

At 740, the stored data is interfaced to one or more applications. Such applications can employ the search engine results to create an interactive replica of data. Communicating with the stored data can involve a plurality of disparate protocols, data structures, and the like in order to properly access desired data. At 750, the results from the search engine are utilized to optimize development. In one approach, various results are stored in a particular structure (e.g., XML, HTML, etc.) to be utilized to create and/or simulate search engine activity. In this manner, a developer can employ such optimization to access and utilize data for a particular application, for example.

FIG. 8 illustrates a methodology 800 wherein stored data is assembled and utilized by at least one device. At 810, data is located via a search engine in accordance with various parameters as determined by at least one user. At 820, data (e.g., search terms, search instructions, data elements, etc.) associated with each search is stored in a query log. After such search is performed, returned results from each search are stored in a results cache. The results cache can store data returned from one or more searches, as desired. Such returns can include not only data itself, but also metadata that can describe various properties of the data. Such properties can include location of the data, format of the data, conforming standards of the data and the like.

At 840, at least one of the query log and results cache are interrogated. In this manner, desired data can be acquired without the employment of a search engine (or other real time mechanism), for example. The acquisition of such data without taxing system resources (e.g., the search engine) provides a distinct advantage over conventional methods. Such advantages include, but are not limited to efficiency of the system, access to more consumable data, pre-formatting of the data, etc. At 850, data retrieved from at least one of the query log and/or the results cache is assembled for consumption by at least one device.

FIG. 9 illustrates a methodology wherein an API is employed to locate and implement data. At 910, a search for particular data is conducted. As noted above, various aspects of data can be defined and employed to locate and retrieve desired data. At 920, the search results are placed in a returns store. Such data can be available to substantially any disparate device that can interface to the returns store. Additionally, data can include pointers to data sources such that data, which is not actually in the store, can be immediately accessed via one or more data pointers. At 930, an API is utilized to locate particular data within the returns store. Such data can be located based on various factors, as mentioned previously herein.

At 940, search engine results are structured to conform to development needs. Such data structure can include the type, format, class, content, etc. of information to be implemented in development. In this manner, data can be deconstructed and subsequently reassembled efficiently. In addition, such structured data can be sourced from a search engine, returns store and/or query log, for example. At 950, this data is implemented in one or more applications. Such data implementation can take advantage of search engine results by optimizing the utilizing of such data per the requirements of the developer and/or application with which such data is implemented.

Figure 10:
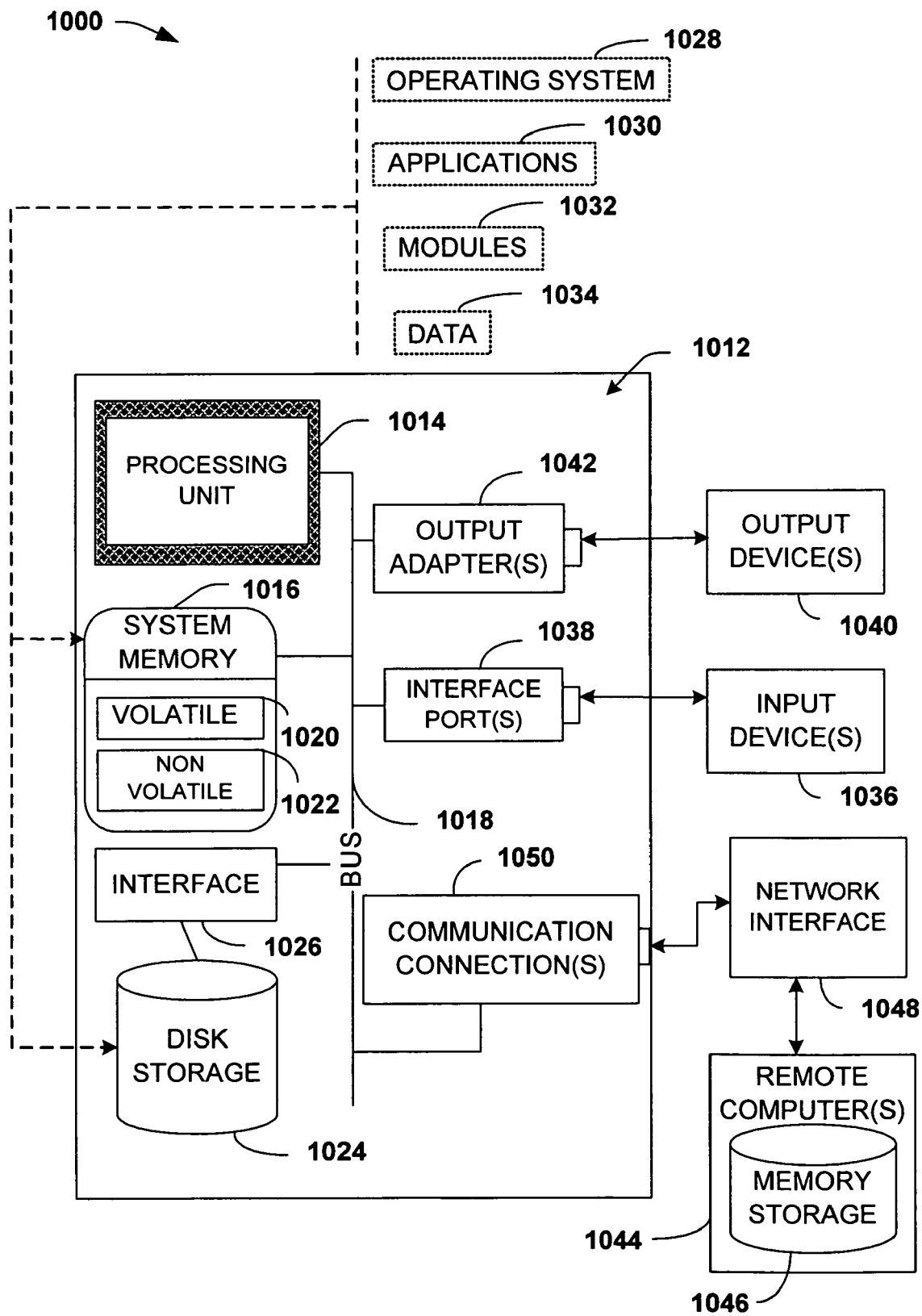
FIG. 10 illustrates an exemplary computing environment in accordance with various aspects.

With reference to FIG. 10, an exemplary environment 1000 for implementing various aspects of the invention includes a computer 1012 is depicted. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI.

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
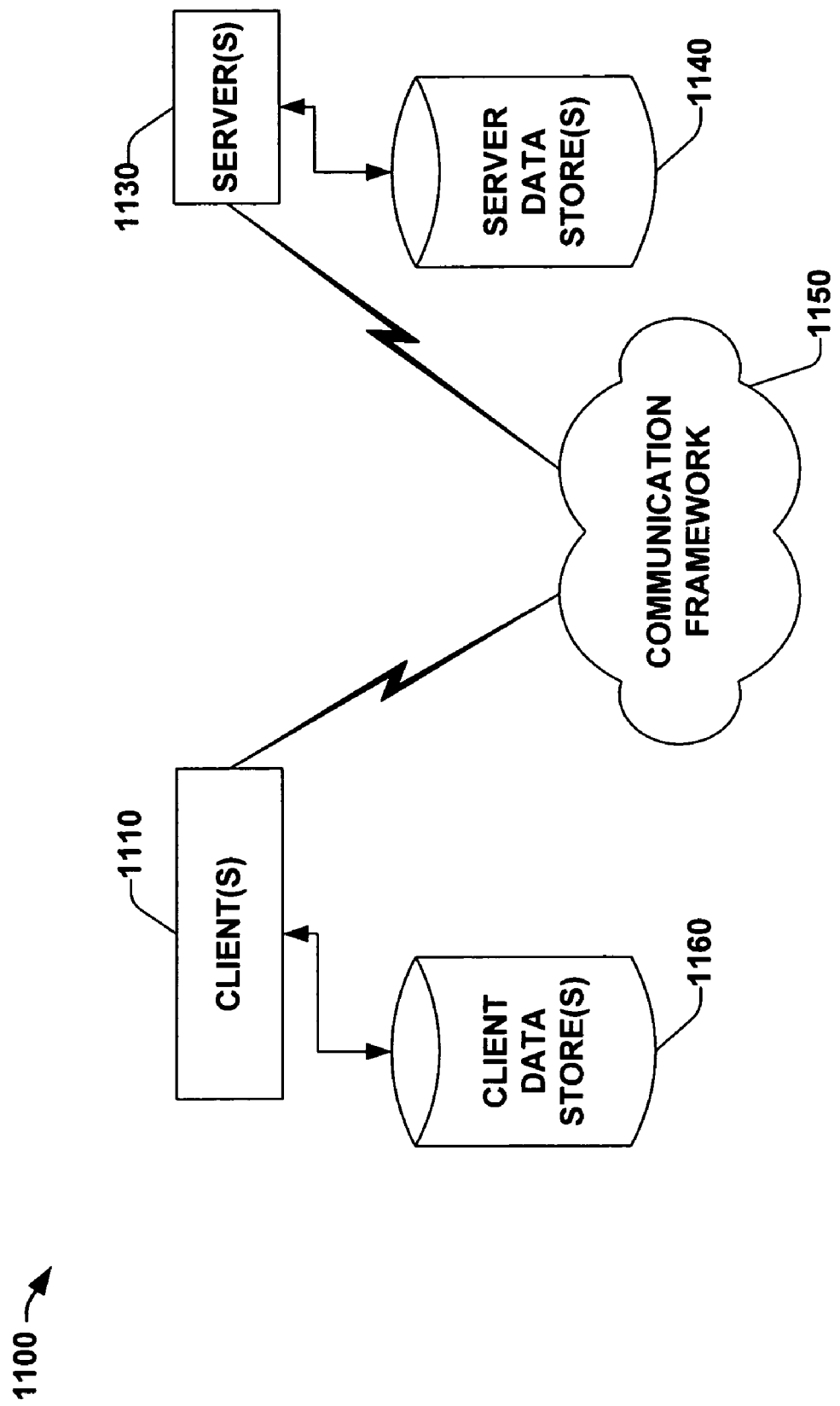
FIG. 11 illustrates an exemplary network that can be employed in accordance with various aspects.

FIG. 11 illustrates an exemplary computing environment 1100 in which the subject invention can be employed. The system 1100 includes one or more client(s) 1110. The client(s) 1110 can be hardware and/or software (e.g., threads, processes, computing devices). The system 1100 additionally includes one or more server(s) 1130. Likewise, the server(s) 1130 can be hardware and/or software (e.g., threads, processes, computing devices).

One possible communication between a client 1110 and a server 1130 can be in the form of a data packet transmitted between two or more computer processes. The system 1100 further includes a communication framework 1150 that can be employed to facilitate communications between the client(s) 1110 and the server(s) 1130. The client(s) 1110 can interface with one or more client data store(s) 1160, which can be employed to store information local to the client(s) 1110. Similarly, the server(s) 1130 can interface with one or more server data store(s) 1140, which can be employed to store information local to the servers 1130.

Appendix A describes various class libraries and application program interfaces (APIs), and is considered part of the subject specification. It will be appreciated that while the class libraries, APIs, etc., described in Appendix A can be utilized in conjunction with various aspects set forth herein, such class libraries and/or APIs are not to be interpreted in a limiting sense or as delineating the scope of the subject invention. Rather, the libraries and APIs described in Appendix A are exemplary in nature, and the subject invention can be utilized in conjunction with these and/or any other suitable class libraries, APIs, etc.

What has been described above includes examples of the subject invention. It is, of course, not possible to describe every conceivable combination of components or methodologies for purposes of describing the subject invention, but one of ordinary skill in the art can recognize that many further combinations and permutations of the subject invention are possible. Accordingly, the subject invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature can be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A system that provides data to a user, comprising the following components stored in computer memory and executable by a processor:

a library component that stores information relating to at least one result from a result set returned by a search engine, the result stored in an extensible mark-up language (XML) form, wherein the library component can automatically modify the structure of the at least one search engine result based upon at least one need of an application or one need of a user;

an application program interface (API) component that specifies how one or more applications interface to the library component to optimize utilization of at least one search engine result including at least one fabricated web page that is a result page of a particular search engine, employing the stored results from the returned search result sets of a plurality of search engines other than the particular search engine, wherein the web page is assembled from data extracted from the stored results;

an artificial intelligence (AI) component that determines an appropriate location for the at least one search engine result and notifies an accessing component of the appropriate location to provide requested search elements along with decision making based on learned action of a particular data customer in relation to a particular data source, the AI component makes the determination based at least in part on one of a support vector machine, a neural network, a back-propagation network, a feed forward back propagation network, radial basis network, fuzzy logic network, an expert system, a Bayesian network, a data fusion network, or a combination thereof; and a results cache that stores at least one data object returned from a query, where the results cache can organize, edit and construct one or more data objects, the results cache can fabricate web pages that replicate the results from one or more data searches with or without modifications, additions, and removals.

2. The system of claim 1, further comprising a search engine that can accept a set of search elements and return a set of data objects that satisfy the accepted search elements.

3. The system of claim 2, the API component can interface to more than one search engine, and can switch between search engines without changing the application code.

4. The system of claim 1, further comprising a query log that stores information related to at least one search query employed with the search engine.

5. The system of claim 1, the library component combines at least two search engine result sets to implement with the at least one application.

6. A computer implemented method to optimize utilization of data received from at least one search engine, comprising:

storing at least two search engine results from the search result set returned by two or more search engines;

extracting at least one data element from the at least two search engine results, determining through at least one artificial intelligence technique an appropriate location for the at least two search engine results and notifying an accessing component of the appropriate location to provide requested search elements along with decision making based on learned action of a particular data customer in relation to a particular data source, the artificial intelligence technique includes a support vector machine, a neural network, a back-propagation network, a feed forward back propagation network, radial basis network, fuzzy logic network, an expert system, a Bayesian network, a data fusion network, or a combination thereof;

assembling the extracted data to optimize application development based upon at least one need of an application or one need of a user;

implementing the assembled search engine results in at least one application;

fabricating at least one web page that appears to be a result page of a particular search engine, employing the stored results from the returned search result sets of a plurality of search engines other than the particular search engine, wherein the web page is assembled from data extracted from the stored results; and storing at least one data object returned from a query, the results cache can organize, edit and construct one or more data objects as well as fabricate web pages that replicate the results from one or more data searches with or without modifications, additions, and removals.

7. The method of claim 6, further comprising storing data employed to perform a search in a query log.

8. The method of claim 6, further comprising interrogating the one or more stored search results, the one or more search results contain at least one of a resource and a pointer to a resource.

9. The method of claim 8, wherein the pointer is a uniform resource locator.

10. The method of claim 6, further comprising utilizing an application program interface (API) to locate one or more results and retrieve one or more stored results.

11. The method of claim 6, further comprising structuring the at least two search engine results to conform to application development requirements.

12. The method of claim 6, further comprising caching at least one of query and results on at least one of a local memory, a local storage device, and a remote server.

13. The method of claim 6, further comprising switching between two or more search engines.

* * * * *